United States Patent [19]
Hammer et al.

[11] Patent Number: 6,090,357
[45] Date of Patent: Jul. 18, 2000

[54] FLUE GAS SCRUBBING METHOD

[75] Inventors: Michael T. Hammer, Birdsboro; Michael L. Mengel, Fredericksburg, both of Pa.

[73] Assignee: Marsulex Environmental Technologies, LLC, Lebanon, Pa.

[21] Appl. No.: 09/303,834

[22] Filed: May 3, 1999

[51] Int. Cl.[7] .................................................. B01D 53/40
[52] U.S. Cl. ........................ 423/210; 423/243.08; 55/423
[58] Field of Search .............................. 423/243.08, 210; 55/423, 426

[56] References Cited

U.S. PATENT DOCUMENTS

| | | | |
|---|---|---|---|
| 1,170,308 | 2/1916 | Mertz | 261/1 |
| 2,176,196 | 10/1939 | Beamer et al. | 423/243.08 |
| 2,687,184 | 8/1954 | Hutchinson et al. | 183/22 |
| 3,138,442 | 6/1964 | Krantz | 55/227 |
| 3,795,089 | 3/1974 | Reither | 55/227 |
| 3,808,321 | 4/1974 | Fukui et al. | 423/243.08 |
| 3,971,642 | 7/1976 | Perez | 55/223 |
| 4,039,307 | 8/1977 | Bondor | 55/228 |
| 4,049,399 | 9/1977 | Teller | 55/73 |
| 4,255,168 | 3/1981 | Nguyen | 55/85 |
| 4,539,024 | 9/1985 | Stehning et al. | 55/223 |
| 4,539,184 | 9/1985 | Stehning | 422/170 |
| 4,898,720 | 2/1990 | Glindsjö | 423/210 |
| 4,968,335 | 11/1990 | Fujimoto et al. | 55/223 |
| 5,240,482 | 8/1993 | Sung | 55/228 |

FOREIGN PATENT DOCUMENTS

| | | |
|---|---|---|
| 0026163A1 | 4/1981 | European Pat. Off. . |
| 0139352A1 | 5/1985 | European Pat. Off. . |
| 1769945 | 4/1972 | Germany . |
| 2321881 | 2/1974 | Germany ............... 423/243.08 |
| 54-42364A | 4/1979 | Japan . |
| 58-177106A | 10/1983 | Japan . |
| 62-102820 | 5/1987 | Japan . |
| 288740 | 10/1927 | United Kingdom ............... 55/423 |

OTHER PUBLICATIONS

FGD and Denox, Newsletter, Oct. 1994, No. 198, 2 pages.
Influence of Power Input on Efficiency of Dust Scrubbers; Stansford Research Institute, Menlo Park, Conn.; vol. 50, No. 11; Nov. 1958, pp. 1615–1620.

*Primary Examiner*—Steven P. Griffin
*Assistant Examiner*—Timothy C. Vanoy
*Attorney, Agent, or Firm*—Gary M. Hartman; Domenica N.S. Hartman

[57] ABSTRACT

An flue gas scrubbing apparatus and process by which flue gases are contacted by a contact medium while traveling rapidly upward through a passage, such that the contact medium is fully entrained in the upward-flowing flue gases. The gases and the entrained contact medium are then redirected downwardly so that the entrained contact medium impacts the surface of a reservoir of the contact medium contained in the tank, with the result that much of the entrained contact medium is separated from the flue gases. The surface of the reservoir of contact medium causes the flue gases to abruptly change flow direction, flowing horizontally at a reduced velocity so that any remaining contact medium entrained in the gases becomes separated from the gases. After another abrupt change in flow direction, the gases are substantially free of contact medium and can be demisted by conventional means.

10 Claims, 1 Drawing Sheet

FLUE GAS SCRUBBING METHOD

BACKGROUND OF THE INVENTION

1. Field of the Invention

This invention generally relates to gas-liquid contactors used in the removal of acidic gases, such as from utility and industrial flue gases. More particularly, this invention is directed to a gas-liquid contactor whose operation involves the total entrainment of a contact medium in a high-velocity flue gas so as to remove acidic constituents from the gas, followed by substantially complete removal of the entrained contact medium prior to demisting of the gases.

2. Description of the Prior Art

Gas-liquid contactors are widely used to remove substances such as acidic constituents and particulate matter from combustion or flue gases produced by utility and industrial plants. Often of particular concern are sulfur dioxide ($SO_2$) and other acidic gases produced by the combustion of fossil fuels and various industrial operations. Acidic gases are known to be hazardous to the environment, such that their emission into the atmosphere is closely regulated by clean air statutes. The method by which acidic gases are removed with a gas-liquid contactor or other type of flue gas scrubber is known as wet flue gas desulfurization (FGD).

The cleansing action produced by gas-liquid contactors and absorbers is generally derived from the passage of gas through a tower cocurrently or countercurrently to a descending liquid that absorbs sulfur dioxide. Wet flue gas desulfurization processes have typically involved the use of an alkaline scrubbing liquid, such as a calcium-based slurry or a sodium-based or ammonia-based solution. As used herein, a slurry is a mixture of solids and liquids in which the content of the solids can be any desired level, including the extreme condition in which the slurry is termed a moist solid. Examples of calcium-based slurries are limestone (calcium carbonate; $CaCO_3$) slurries and hydrated lime (calcium hydroxide; $Ca(OH)_2$) slurries formed by action of water on lime (calcium oxide; $CaO$). Such slurries react with the acidic gases to form precipitates that can be collected for disposal, recycling or sale. Intimate contact between the alkaline slurry and acidic gases that are present in the flue gases, such as sulfur dioxide, hydrogen chloride (HCl) and hydrogen fluoride (HF), result in the absorption of the gases by the slurry and the formation of salts, such as calcium sulfite ($CaSO_3 \cdot \frac{1}{2}H_2O$), gypsum ($CaSO_4 \cdot 2H_2O$), calcium chloride ($CaCl_2$) and calcium fluoride ($CaF_2$). When desired, forced oxidation of the slurry by aeration is employed to ensure that all of the sulfites will be reacted to form sulfates, and thereby maximize the production of gypsum.

Known gas-liquid contactors typically include an absorber tower equipped with an inlet duct through which combustion gases enter the tower. Above the inlet duct is a bank of spray headers which introduce a contact medium, e.g., an alkaline slurry, into the tower. Additional banks of spray headers are often provided above the first bank of spray headers, as required for a given application. One or more pumps are required to recycle the alkaline slurry by pumping the slurry from a tank at the bottom of the tower to the spray headers. Intimate contact between the contact medium and the flue gases rising through the tower results in a cleansing action, after which the slurry and the entrapped or reacted gases are collected in the tank at the bottom of the tower. The cleansed gases continue to rise through the tower, then typically pass through a mist eliminator and thereafter are either heated or passed directly to the atmosphere through a chimney.

The tower of a conventional gas-liquid contactor typically has a large diameter, so that flue gas velocities through the tower are relatively low, typically less than twelve feet per second (about 3.7 m/s). Such low gas velocities are necessary to accommodate the inability of conventional mist eliminators to remove liquid out of a gas stream at higher velocities. However, higher flue gas velocities through an absorber tower would be advantageous for improving contact between the contact medium and the flue gases, which would reduce the amount of contact medium required for a given amount of flue gases in the tower. Higher flue gas velocities would also allow for the use of a tower having a smaller cross-sectional area, such that the cost of constructing the tower is reduced. However, flue gas velocities above 12 ft/s tend to increase the gas pressure drop within the tower, increasing the likelihood of liquid particles being carried to and flooding the mist eliminator.

In view of the above, it would be desirable if a flue gas scrubbing apparatus were available that was capable of operating at flue gas velocities above 12 ft/s to promote the efficiency of the absorption process, while overcoming the above-noted problems associated with high flue gas velocities.

SUMMARY OF THE INVENTION

The present invention provides an apparatus and process for removing acidic gases from flue gases produced by processing operations of the type carried out in utility and industrial plants. The apparatus is generally a gas-liquid contactor whose operation involves the entrainment of a contact medium in a high-velocity flue gas so as to remove acidic constituents from the gas, followed by the substantially complete removal of the entrained contact medium prior to demisting of the gases.

The contactor of this invention generally includes a first passage having an inlet through which gases are introduced into the first passage and flow upward through the first passage, and one or more suitable devices for introducing a contact medium into the first passage so that essentially all of the contact medium is entrained in the gases and flows upwardly with the gases through the first passage. A structure or device is provided for redirecting the gases and the contact medium from their upward flow direction within the first passage to a downward flow direction, causing the contact medium and gases to impact the surface of a reservoir of contact medium within a tank or other suitable container. Importantly, the flow of gases within the first passage is maintained at a velocity sufficient to carry essentially all of the contact medium from its point of introduction in the passage, and then into contact with the contact medium in the tank. Also important is that the contact medium is prevented from becoming separated from the gases while being redirected toward the contact medium in the tank. Accordingly, the structure or device used to redirect the gases should have a relatively gradual effect, such as that provided by an arcuate passage with a generous radius of curvature.

The impact with the contact medium within the tank causes the entrained contact medium to be at least partially separated from the gases. The tank and the surface of the contact medium define a horizontal flow passage above the contact medium surface, with this passage having a flow cross-section that is greater than the flow cross-section of the first passage such that the gases flow in the horizontal flow passage at a velocity lower than the velocity within the first passage. As a result, any remaining amount of the contact medium entrained in the gases tends to separate from the gases and drop into the tank. Now substantially free of contact medium that would tend to flood a conventional mist eliminator, the gases are redirected from their horizontal flow direction within the tank to an upward flow direction, and toward a mist eliminator or other suitable device for removing moisture from the gases. After demisting, the gases are permitted to escape the gas-liquid contactor through any suitable outlet.

Based on the contactor configuration described above, the present invention generally provides a process by which flue gases are contacted by a contact medium while traveling rapidly upward, such that the contact medium is fully entrained in the flue gases. The gases and the entrained contact medium are then redirected downwardly so that the entrained contact medium impacts the surface of the contact medium within the tank, with the result that much of the entrained contact medium is separated from the flue gases. The contact medium surface causes the flue gases to abruptly change flow direction, flowing horizontally at a reduced velocity so that any remaining contact medium entrained in the gases becomes separated from the gases. After another abrupt change in flow direction, the gases are substantially free of contact medium and can be demisted by conventional means.

A significant advantage of the present invention is that the velocity of the flue gases during the contacting process can be significantly increased over that possible with prior art gas-liquid contactors. Because of the relatively high velocities, improved contact between the contact medium and the flue gases results, such that a reduced contact medium flow can be employed while maintaining a proper cleansing effect. The higher flue gas velocities also allow the tower to have a reduced cross-sectional area, resulting in reduced cost to construct the gas-liquid contactor.

Other objects and advantages of this invention will be better appreciated from the following detailed description.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
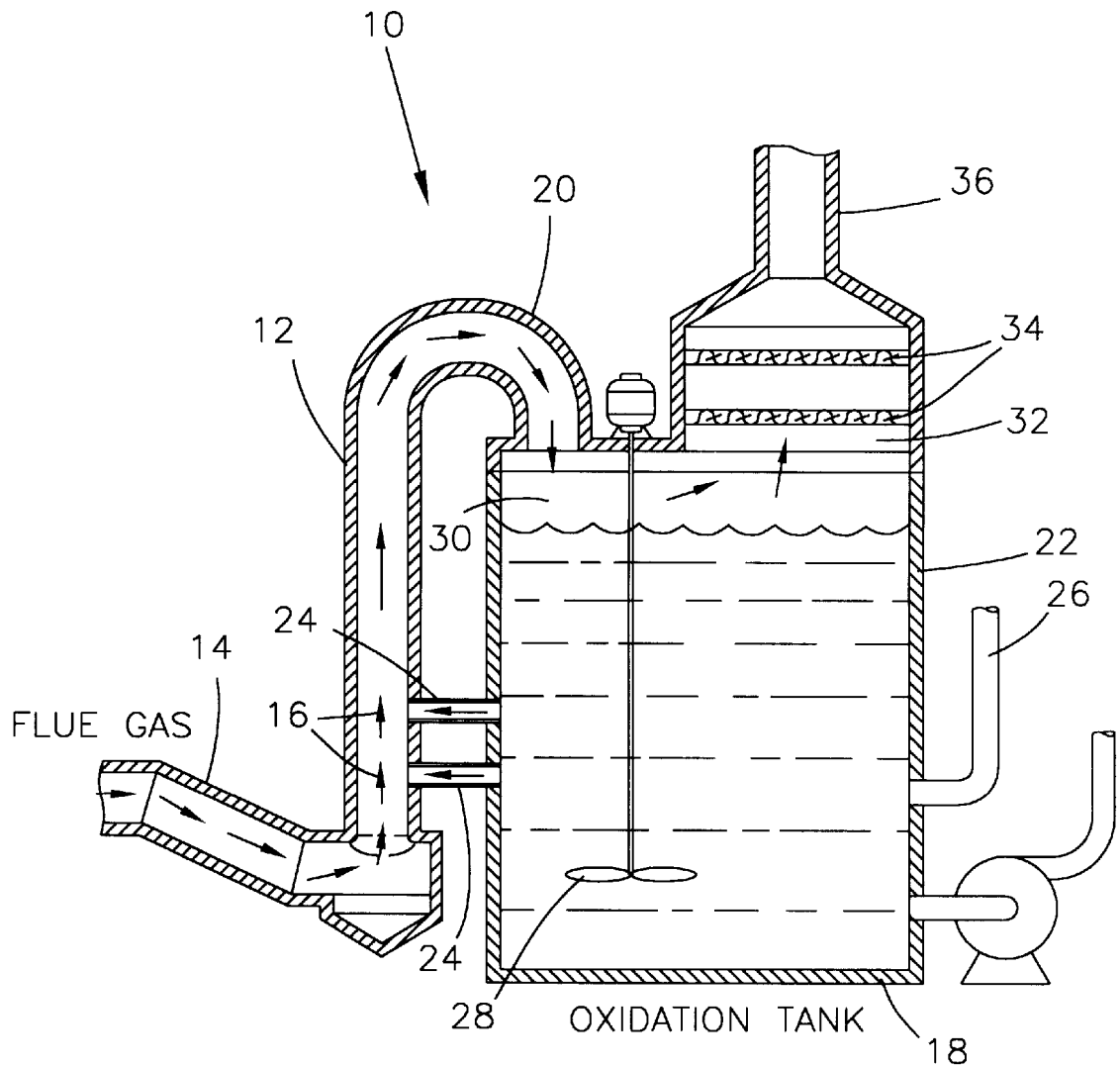
FIG. 1 is a schematic representation of a gas-liquid contactor in accordance with a preferred embodiment of this invention.

In accordance with the teachings of the present invention, FIG. 1 schematically illustrates a gas-liquid contactor 10 configured to permit high flue gas velocities within an absorber tower 12 where the gases are contacted by a contact medium, but then eliminates the contact medium prior to the gases passing through a demisting device. While the contactor 10 is illustrated as being of a particular construction, those skilled in the art will recognize that the teachings of this invention can be applied to structures that differ in appearance from the gas-liquid contactor 10 of FIG. 1, and used in other processes to remove undesirable gases, mist, dust, fumes, smoke and/or particulate matter from a stream of gas.

The absorber tower 12 shown in FIG. 1 generally has an upright construction, with a lower end of the tower 12 being equipped with an inlet duct 14 through which flue gases enter the tower 12. As is well known in the art, the source of the flue gases may be a process involving the combustion of fossil fuels or various industrial operations by which undesirable gases or particulate matter are produced. According to this invention, the flow cross-section of the tower 12 is sized so that the flue gases flow at high velocities relative to conventional absorber towers, e.g., well in excess of twelve feet per second (about 3.7 m/s). As shown in FIG. 1, the duct 14 has a particular shape, generally horizontal but sloping vertically immediately prior to its attachment to the tower 12, at which point the duct 14 includes a conical reservoir below the tower 12. The purpose of the configuration illustrated for the duct 14 is to prevent the contact medium from entering equipment upstream of the contactor 10 in the event an upset condition occurs, during which the contact medium would drop out of the high velocity tower 12. In such an event, the duct 14 would be able to contain the entire volume of contact medium that was in tower 12 at the time the upset condition occurred. The transition from the duct 14 to the bottom of the tower 12 is also preferably restricted to increase the gas velocity above that within the remainder of the tower 12 by about 50%. This feature of the duct 14 prevents any contact medium on the walls of the tower 12 from dropping down into the duct 14 under normal operating conditions.

Above the inlet duct 12, the tower 12 is equipped with spray headers 16 through which the contact medium is introduced into the tower 12 for contact with the flue gases. It is foreseeable that any number of headers 16 could be used, or that the medium could be introduced by other devices. As shown, the contact medium is supplied to the spray headers 16 from a tank 18, which will be discussed in greater detail below. The contact medium is generally a slurry or liquid containing such conventional alkali reagents as sodium, calcium, magnesium and ammonia, which are able to react with sulfur dioxide and other acidic gases produced by the combustion of fossil fuels and various industrial operations. An example of a suitable contact medium is a slurry of water with a relatively high concentration of lime or limestone suspended in water, which react with sulfur dioxide to form calcium sulfite. The contact medium is preferably introduced into the tower 12 so as to provide for intimate contact between the contact medium and the flue gases rising through the tower 12. The interaction between the contact medium and the flue gases yields a cleansed flue gas in which the contact medium is entrained, with the entrained contact medium containing the particulate matter and acidic gases absorbed from the flue gases.

As an important feature of this invention, the contact medium does not flow countercurrently to the flue gas flow, as typically required by prior art gas-liquid contactors, but instead travels in the same direction as the flue gases within the tower 12. For this purpose, the velocity of the flue gases within the tower 12 is sufficiently high so as to carry essentially all of the contact medium through an arcuate passage 20 at the upper end of the tower 12, after which the contact medium is disengaged from the flue gas. The flue gas velocity and the arcuate passage 20 also cooperate to inhibit the contact medium from draining down the walls of the tower 12. For this reason, a minimum flue gas velocity is about twenty-eight feet per second (about 8.5 m/s), with velocities as high as at least sixty-five feet per second (about 20 m/s) being possible. Such velocities can be achieved by appropriately sizing the cross-sectional area of the tower 12 to the quantity of flue gases to be treated, though it is foreseeable that various devices could be employed to increase and/or maintain the velocity of the flue gases within the tower 12.

As seen in FIG. 1, the arcuate passage 20 reverses the direction of the flue gases and the entrained contact medium, so that they flow downwardly and thereafter impact a body 22 of contact medium contained within the tank 18. To initiate separation of entrained contact medium from the flue gases prior to impact with the body 22, the arcuate passage 20 preferably does not abruptly change the flow direction of the gases, but instead has a large radius of curvature, generally on the order of at least about 1.5 times the diameter of the passage 20, depending on the flue gas velocity. The flow cross-section of the arcuate passage 20 is preferably the same as that of the tower 12 in order to maintain a substantially constant flow velocity and minimize flow disruptions, thereby encouraging initial disengagement of the contact medium. As a result, disengagement of the contact medium from the flue gases is initiated prior to impact with the body 22 of contact medium within the tank 18, at which point the contact medium is captured by the body 22.

As noted previously, the tank 18 supplies the contact medium to the spray headers 16 in the tower 12. Within the tank 18, sulfur dioxide absorbed by the contact medium is in the form of sulfites ($SO_3^{--}$) and bisulfites ($HSO_3^-$), which can then be oxidized to produce sulfates ($SO_4^{--}$). Oxidation of the body 22 of contact medium is promoted by the addition of compressed air 26 near the bottom of the tank 18, and by agitation with any suitable device such as the aerator 28 shown, which assists in distributing and dissolving the oxygen in the contact medium.

As illustrated in FIG. 1, the level of the contact medium within the tank 18 is maintained at a level above that of the spray headers 16, so that the contact medium is fed by gravity through conduits 24 to the spray headers 16 without the use of a pump. Elimination of a pump reduces the construction, operation and maintenance costs of the contactor 10, and permits the solids content of the contact medium delivered to the headers 16 to be optimized for the existing absorption conditions. The contact medium within the body 22 contained in the tank 18 generally becomes segregated, with the contact medium near the top of the tank 18 being less dense than the contact medium that settles closer to the bottom of the tank 18. As a result, the density of the contact medium fed to the spray headers 16 can be controlled in part by the location on the tank 18 from which the contact medium is drawn, and the denser contact medium at the bottom of the tank 18 can be pumped to a dewatering system, as indicated in FIG. 1. The dewatering system can be any suitable type known in the art, and is employed to remove excess water from the contact medium for the purpose of extracting solids from the contact medium. For example, gypsum ($CaSO_4.2H_2O$) can be produced as a product of the reaction between sulfates and a calcium-based alkali (e.g., lime or limestone) in the contact medium. The contact medium can be fed directly to the dewatering system if it contains a sufficiently high solids concentration.

As seen from FIG. 1, the tank 18 and the surface of the body 22 of contact medium define a horizontal passage 30 through which the flue gases are abruptly forced to flow after impacting the surface of the contact medium. According to the invention, the flow cross-section of this passage 30 is larger than that of the tower 12 and arcuate passage 20, so that gas velocities through the passage 30 drop significantly and any remaining contact medium entrained in the flue gases is likely to fall into the tank 18. Depending on the particular operating conditions of the contactor 10, it is believed that the cross-section of the passage 30 should be at least about 600 percent greater than that of the tower 12 and the arcuate passage 20 in order to separate substantially all of the remaining contact medium from the flue gases.

Thereafter, the flue gases are again forced to make an abrupt change in flow direction, flowing vertically upward through a vertical duct 32 containing one or more mist eliminators 34 of any suitable type known in the art. With the removal of substantially all contact medium from the flue gases, the mist eliminators 34 are able to remove any remaining fine liquid droplets from the cleansed flue gas, and return these droplets to the tank 18. To ensure proper operation of the mist eliminators 34, the duct 32 is sized to achieve or maintain a flue gas velocity that is compatible with the mist eliminators, e.g., not more than twelve feet per second if conventional mist eliminators are used. Thereafter, the cleansed flue gases pass through a chimney 36, at which point the gases may be heated or exhausted directly into the atmosphere.

In view of the above, it can be seen that a significant advantage of the present invention is that the velocity of the flue gases through the tower 12 is significantly higher than that possible with spray towers employing conventional mist eliminators. Because of the high velocities within the tower 12, improved contact between the contact medium and the flue gases results, such that a reduced flow rate of the contact medium to the tower 12 can be employed while maintaining an appropriate cleansing effect. The higher flue gas velocities also allow the tower 12 to have a reduced cross-sectional area, resulting in reduced costs to construct and maintain the contactor 10. Yet with the benefits of higher contact velocities, the contactor 10 of this invention is able to remove substantially all of the contact medium from the flue gases before reaching the mist eliminators 34, and also reduces the flue gas velocity at the mist eliminators 34, so that conventional mist eliminator designs can be used.

While our invention has been described in terms of preferred embodiments, it is apparent that other forms could be adopted by one skilled in the art, such as by incorporating the novel features of this invention within gas-liquid contactors that differ structurally from that shown in the Figures. Accordingly, the scope of our invention is to be limited only by the following claims.

What is claimed is:

1. A method of scrubbing flue gases comprising the steps of:

introducing flue gases through an inlet into a first passage having a flow cross-section, the gases flowing upward through the first passage;

introducing a contact medium comprising an aqueous slurry containing an alkali reagent into the first passage so that essentially all of the contact medium is entrained in the gases and absorbs acidic constituents in the gases and flows in an upward flow direction with the gases through the first passage, the gases within the first passage being flowed at a velocity sufficient to substantially prevent the contact medium from flowing countercurrent to the gases through the first passage;

redirecting the gases and the contact medium from the upward flow direction within the first passage to a downward flow direction so that the contact medium impacts a surface of a body of fluid in a container and so that at least a portion of the contact medium is separated from the gases;

flowing the gases horizontally through a horizontal flow passage defined by the container and the body of fluid, the horizontal flow passage having a flow cross-section that is greater than the flow cross-section of the first passage such that the gases flow horizontally in the horizontal flow passage at a velocity lower than the velocity of the gases within the first passage, thereby causing at least a portion of any remaining amount of the contact medium entrained in the gases to become separated from the gases; and allowing the gases to escape the horizontal flow passage.

2. A method as recited in claim 1, wherein the body of fluid within the container consists essentially of the contact medium and compounds absorbed by the contact medium from the gases, the method further comprising the step of returning the contact medium from the container to the first passage under the force of gravity.

3. A method as recited in claim 1, wherein the gases are introduced into the first passage at a velocity greater than the gas velocity within the first passage to prevent any contact medium on a surface of the first passage from dropping down through the inlet.

4. A method as recited in claim 1, further comprising an upset condition that occurs by interrupting the flow of the gases through the inlet into the first passage, wherein the contact medium drops out of the first passage and is contained within a reservoir below the inlet, wherein the entire volume of contact medium that was in the first passage at the time the upset condition occurred is accommodated by the reservoir.

5. A method as recited in claim 1, further comprising the step of oxidizing the contact medium within the container.

6. A method as recited in claim 1, further comprising the step of removing solids from the container.

7. A method as recited in claim 1, further comprising the step of agitating the contact medium within the container.

8. A method as recited in claim 1, wherein during the step of redirecting the gases and the contact medium from the upward flow direction within the first passage to a downward flow direction, the change in gas direction occurs sufficiently gradually to initiate separation of the contact medium from the gases before impacting the body of fluid in the container.

9. A method as recited in claim 1, wherein the velocity of the gases within the first passage is at least 28 feet per second.

10. A method as recited in claim 1, wherein the velocity of the gases at the inlet is about 50% higher than the velocity of the gases within the first passage.

* * * * *